United States Patent
Cohen

(10) Patent No.: US 7,025,417 B2
(45) Date of Patent: Apr. 11, 2006

(54) LOAD DEFORMABLE BICYCLE SEAT

(76) Inventor: Joshua Dov Cohen, 1002 F. Kingswood Dr., Chapel Hill, NC (US) 27517

(*) Notice: Subject to any disclaimer, the term of this patent is extended or adjusted under 35 U.S.C. 154(b) by 0 days.

(21) Appl. No.: 10/501,448

(22) PCT Filed: Jan. 16, 2003

(86) PCT No.: PCT/US03/01416

§ 371 (c)(1),
(2), (4) Date: Jul. 13, 2004

(87) PCT Pub. No.: WO03/062035

PCT Pub. Date: Jul. 31, 2003

(65) Prior Publication Data

US 2005/0017552 A1    Jan. 27, 2005

Related U.S. Application Data

(60) Provisional application No. 60/349,018, filed on Jan. 17, 2002.

(51) Int. Cl.
*B60N 2/38*    (2006.01)

(52) U.S. Cl. ............... 297/195.1; 297/202; 297/214; 297/215.16

(58) Field of Classification Search ............. 297/195.1, 297/202, 214, 215.16, DIG. 8
See application file for complete search history.

(56) References Cited

U.S. PATENT DOCUMENTS

| | | | | |
|---|---|---|---|---|
| 3,588,171 A | * | 6/1971 | Rich | 297/215.16 |
| 4,369,998 A | * | 1/1983 | Blase | 297/215.16 |
| 5,074,618 A | * | 12/1991 | Ballard | 297/199 |
| 5,318,344 A | * | 6/1994 | Wang | 297/199 |
| 5,330,249 A | * | 7/1994 | Weber et al. | 297/214 |
| 5,645,315 A | | 7/1997 | Walker et al. | |
| 5,725,274 A | | 3/1998 | Bergmeister | |
| 5,855,410 A | | 1/1999 | Lin | |
| 5,873,626 A | | 2/1999 | Katz | |
| 5,988,739 A | | 11/1999 | Dodge et al. | |
| 5,988,740 A | | 11/1999 | Caraballo | |
| 6,019,423 A | | 2/2000 | Dodge et al. | |
| 6,039,396 A | * | 3/2000 | Muser | 297/214 |
| 6,106,059 A | | 8/2000 | Minkow et al. | |
| 6,131,994 A | | 10/2000 | Yates | |
| 6,149,230 A | | 11/2000 | Bontrager | |

(Continued)

*Primary Examiner*—Peter M. Cuomo
*Assistant Examiner*—Erika Garrett
(74) *Attorney, Agent, or Firm*—Andrew T. Prokopetz

(57) ABSTRACT

A load deformable bicycle seat comprising a unique substantially flat posterior body section (PS) on which the rider sits, a unique load deformable elongated hollow nose section (NS) of the seat (20). The posterior section (PS) of the seat supports and is designed to promote pressure distribution around the ischael tuberosities. The seat surface is substantially flat or shaped slightly concave to avoid pushing into the perineal region of the groin. The nose (NS) comprises an integrated hollow tubular piece of deformable plastic, rubber, or other material having a rounded and sealed anterior portion (21).

10 Claims, 4 Drawing Sheets

U.S. PATENT DOCUMENTS

| | | |
|---|---|---|
| 6,209,954 B1 | 4/2001 | Bombardier |
| 6,231,122 B1 | 5/2001 | Goldstein |
| 6,244,655 B1 | 6/2001 | Minkow et al. |
| 6,254,180 B1 * | 7/2001 | Nelson ......................... 297/201 |
| 6,257,662 B1 * | 7/2001 | Yates .......................... 297/214 |
| 6,260,919 B1 * | 7/2001 | Yates .......................... 297/215 |
| 6,357,811 B1 * | 3/2002 | Nakamura et al. ............ 296/26 |
| 6,371,554 B1 * | 4/2002 | Ko ............................. 297/201 |
| 6,402,235 B1 | 6/2002 | Letendre |
| 6,409,865 B1 * | 6/2002 | Yates .......................... 156/214 |
| 6,422,647 B1 | 7/2002 | Turudich |
| 6,450,572 B1 | 9/2002 | Kuipers |
| 6,471,291 B1 | 10/2002 | Dodge et al. |
| 6,523,891 B1 * | 2/2003 | Yates .......................... 297/202 |

* cited by examiner

LOAD DEFORMABLE BICYCLE SEAT

RELATION TO PREVIOUSLY-FILED PROVISIONAL PATENT APPLICATION

The present non-provisional, PCT application for patent entitled "Load Deformable Bicycle Seat" stems from, relates to, claims the benefit of, relies on the priority of, improves upon, and enhances the subject matter of the previously-filed provisional patent application Ser. No. 60/349,018, filed Jan. 17, 2002, under the title "'M' Shaped Bicycle Seat with Ergonomic Nose".

FIELD OF THE INVENTION

The invention relates, in general, to bicycle seat constructions and more specifically to a bicycle seat comprising a unique substantially flat posterior body section on which the rider sits, a unique load deformable elongated hollow nose section, and a unique transition at the join of the body section to the nose section of the seat.

BACKGROUND OF THE INVENTION

So-called anatomically correct bicycle seat constructions having a somewhat flat seat for the buttocks area are found in U.S. Pat. Nos. 5,988,739 and 6,019,423. U.S. Pat. Nos. 6,106,059 and 6,244,655 illustrate seats that eliminate pressure in the perineal areas. Several United States patents, notably patents D408,159; D25,153; D27,307; D27,730; D28,434; 5,988,739; 6,231,122 and 6,244,655 describe a somewhat flattened seat section, and U.S. Pat. Nos. D428,271; D431,920; D27,307; and D28,434 illustrate various forms of abrupt transition from a body section to a nose section.

Despite what can be observed in the prior art patents cited above, little has changed in seat design since the late 1800s. Discomfort of bicycle seats, for example, causes people to discontinue cycling. Male impotence, the most publicized risk associated with bicycle seats, represents one of several clinical syndromes associated with current bicycle seat designs. Recent studies support the theory that a decrease in penile oxygen does occur when riding seated on a bicycle equipped with a seat of current design. Seat design is also known to affect how certain arteries are compressed. The teachings of U.S. Pat. No. 6,106,059 will be found helpful in understanding how bicycle seat designs affect body functions.

SUMMARY OF THE INVENTION

A bicycle seat according to the present invention, as expressed in general terms, includes a specific combination of elements comprising: 1) a nose section having a hollow portion constructed such that when loaded it can deform to a limited extent; 2) a substantially wide, substantially flat and substantially rigid posterior section forming a seat; and 3) an abrupt transition section between the posterior section and the nose section.

Expressed in terms more akin to a biomechanical viewpoint, the load deformable bicycle seat of the present invention provides:

1. A substantially flat posterior section providing a seat that slopes downwards towards the nose section, and redistributes the contact pressure through the gluteal muscles and hamstrings and away from the perineum (the central, soft groin tissue).
2. An abrupt transition section between the nose section and posterior section of the bicycle seat designed to avoid arterial and nerve compression along the pelvic bony structure (namely the medial borders of the pubic rami).
3. A hollow, deformable nose section that places contact pressure along the center of the pelvis initially and is able to redistribute the pressure through the lateral perineal structures, in response to which such structures are able to best tolerate contact pressure as the load on the seat nose increases.

DESCRIPTION OF THE INVENTION

Figure 2:
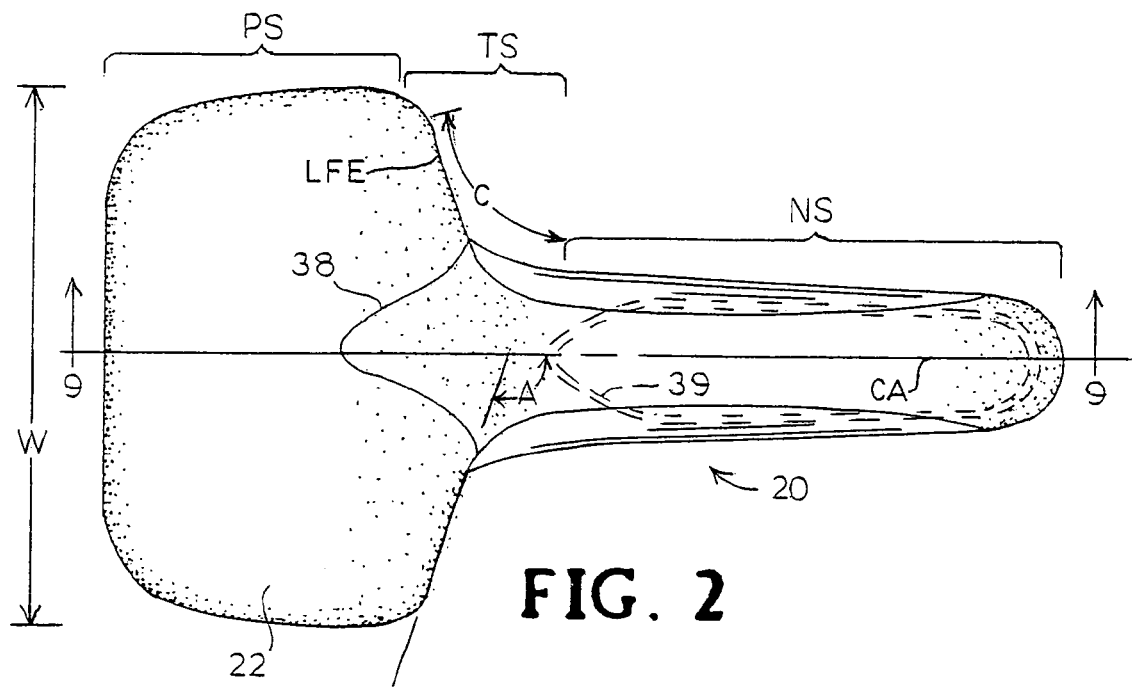
FIG. 2 is a top plan view of the bicycle seat of FIG. 1.
Figure 3:
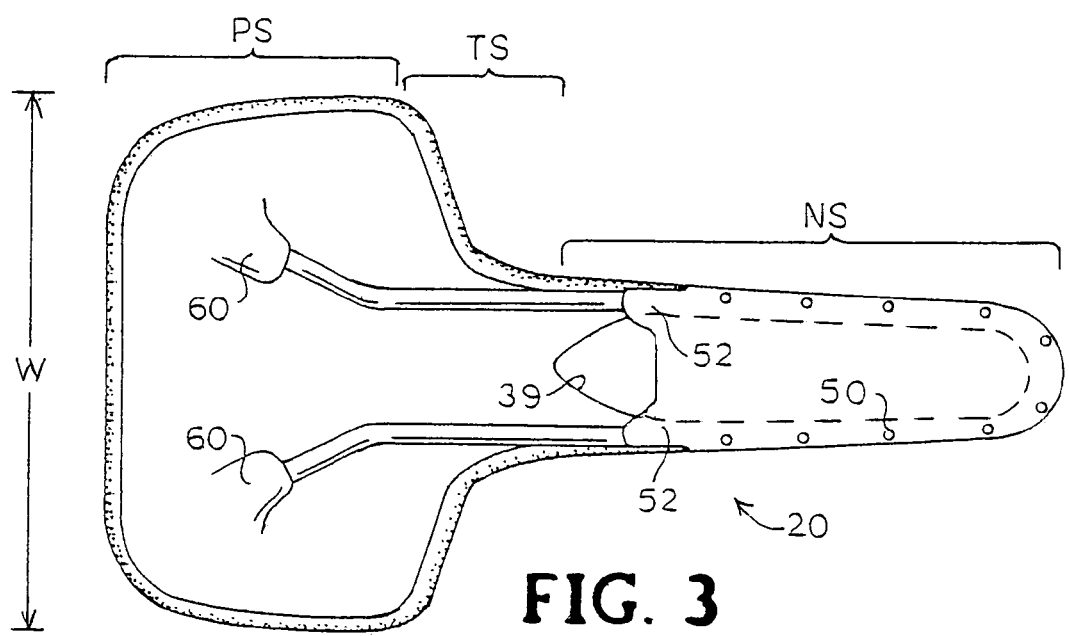
FIG. 3 is a bottom plan view of the bicycle seat of FIG. 1.
Figure 5:
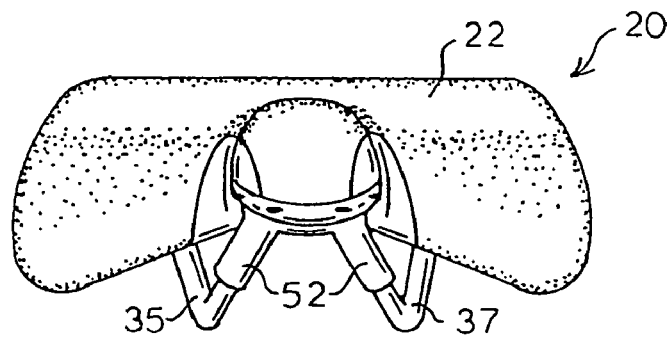
FIG. 5 is a front elevation view of the bicycle seat of FIG. 1.
Figure 6:
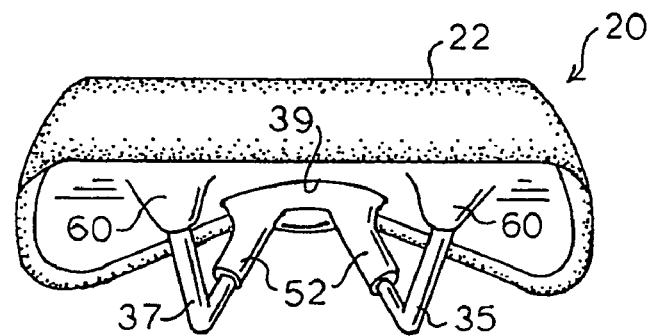
FIG. 6 is a rear elevation view of the bicycle seat of FIG. 1.

Referring initially to FIG. 2 and the prior description, it will again be noted that the deformable bicycle seat 20 of the invention comprises three sections, namely a posterior section PS, a nose section NS, and an abrupt transition section TS.

Posterior section PS of seat 20 supports and is designed to promote pressure distribution around the ischeal tuberosities. The seat surface 22 is substantially flat or shaped slightly concave to avoid pushing into the perineal region of the groin. The width W (FIG. 2) of seat 20 is preferably at least 115 mm from side to side.

Figure 9:
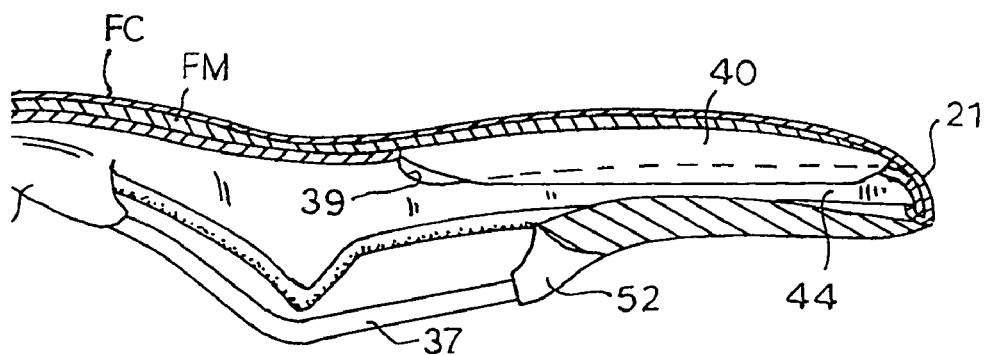
FIG. 9 is a longitudinal section view taken in the direction of lines 9—9 of FIG. 2.
Figure 10:
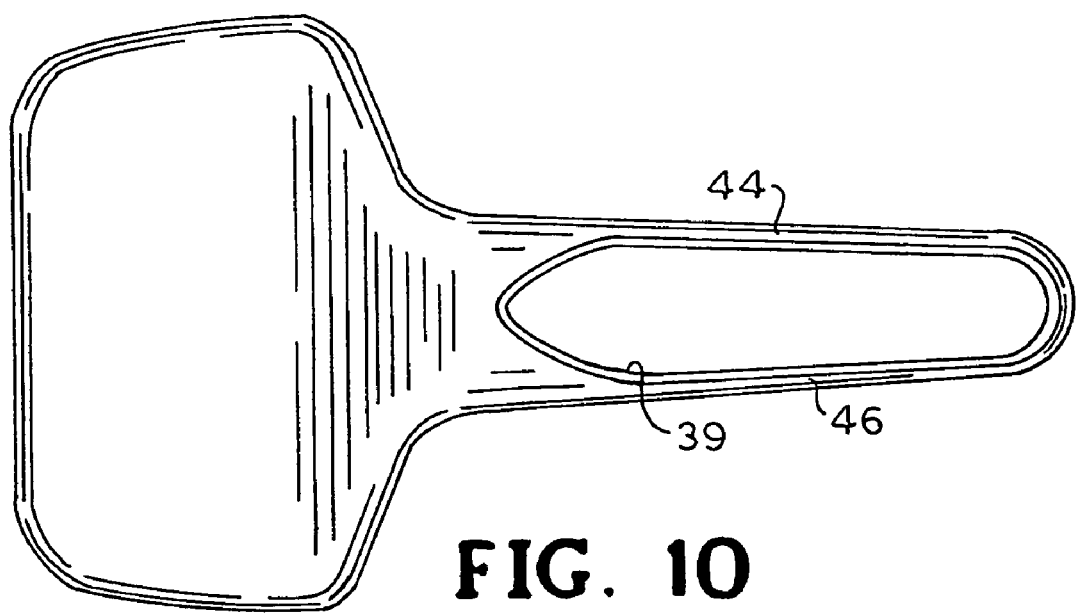
FIG. 10 is a top plan view of the seat surface without the longitudinal rib section or pad end cover.

Nose section NS comprises an integrated hollow tubular piece of plastic, hard rubber, or the like having, as seen in cross section (FIG. 9), and a rounded and sealed anterior portion 21. Hollow tubular nose section NS extends outwardly from the posterior section PS as indicated in FIG. 2. Nose section NS has a hollow space 39 formed therein to receive a rib 40 (FIG. 10). The purpose of rib 40 is to provide deformable support and also limit the amount of downward deformation within the medial portion of nose section NS of seat 20 and provide suspension to the center of nose section NS. This allows for the primary region of pressure deformation through nose section NS to be located centrally. As the load and external pressure on rib 40 of nose section NS increases, the center portion (FIG. 8) of rib 40 will deform downwardly and thus spread the pressure towards the lateral aspects of the nose section NS. The deformation would occur downwardly from the point at which the center portion (FIG. 8) of rib 40 of nose section NS would contacts the interior portion 31 (FIG. 8) of nose section NS and thereby creating a mechanical stop (FIG. 8) to further deformation. The bottom portion of nose section NS is made sufficiently thick in radius to allow the insertion of the front portion of seat rails 35, 37. The density and deformability of rib 40 of nose section NS could be varied in different seats to correspond to different rider weight limits.

The flat posterior of seat 20 will transition along a circumference C (FIG. 2) less than 5 inches to nose section NS of seat 20 within transition section TS and within an angle A of between 90 and 125 degrees between the leading front edge of the posterior section LFE and the central axis of the nose section CA (FIG. 2). This abrupt transition functions to remove pressure from the medial border of the pubic rami during anteriorly rotated pelvic positions.

Figure 8:
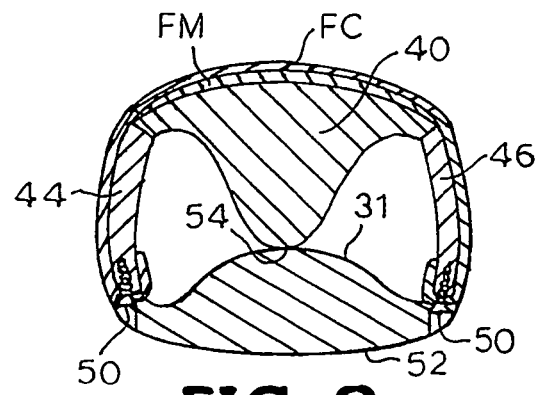
FIG. 8 is an enlarged cross-section view of the nose section taken in the direction of lines 7—7 of FIG. 4 with the nose section under load.

Rib 40 is made up of an upper half and a lower longitudinal rib located between side walls 44, 46. Screws 50 join walls 44, 46 to a lower half 52. Rib 40 is formed of a deformable molded material, which deforms when nose section NS is loaded as depicted in FIG. 8. It should be emphasized that the deformable material can be made of different degrees of hardness. Thus, the weight of the user would determine what degree of hardness would be chosen.

Lower half 52 is formed of a relatively rigid material and provides a stop 54 to limit travel of rib 40. Rib 40 thus allows for the initial pressure on nose section NS to be on the center line perineal structures, and, as the load is increased, it permits the pressure to be dispersed to lateral aspects of the perineum.

Figure 1:
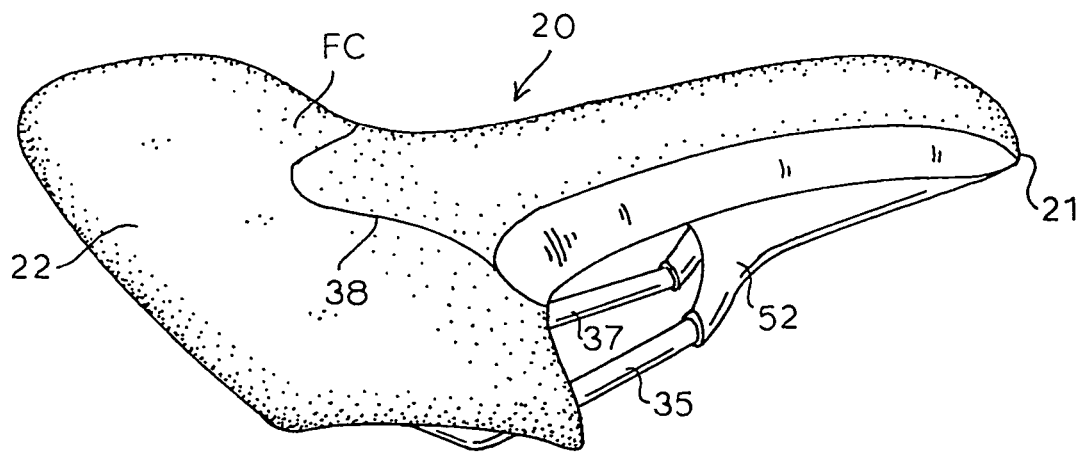
FIG. 1 is a perspective view of a load deformable bicycle seat according to the invention.
Figure 4:
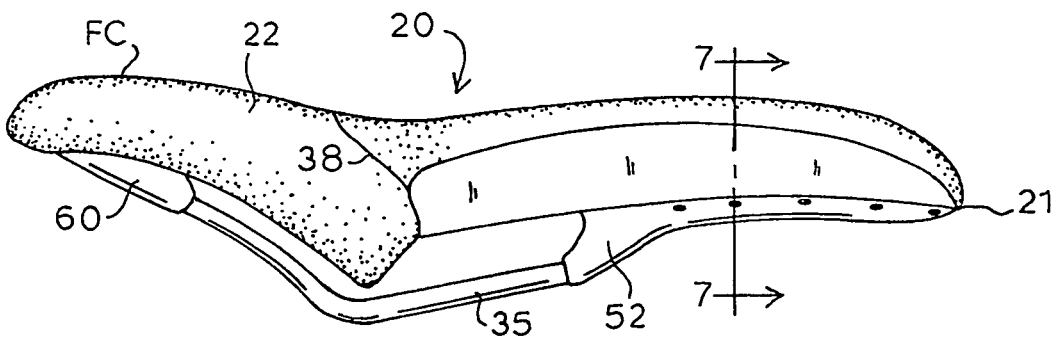
FIG. 4 is a side elevation view of the bicycle seat of FIG. 1, the opposite side elevation view being a mirror image of that shown.
Figure 7:
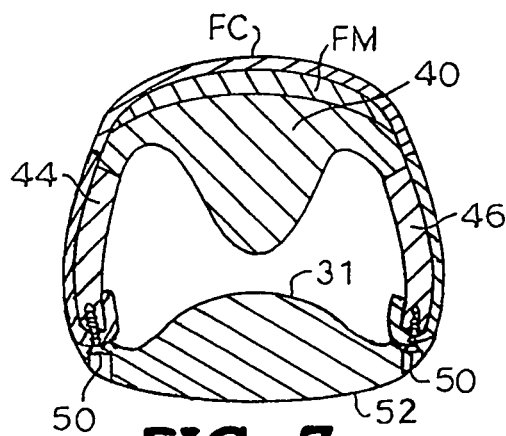
FIG. 7 is an enlarged cross-section view of the nose section taken in the direction of lines 7—7 of FIG. 4 and with the nose section free of load.

It will be noted that the front ends of rails 35, 37 are anchored in the lower half 52 of nose section NS (FIG. 4) whereas the rear ends of rails 35, 37 are anchored in locks 60 forming part of the posterior section PS (FIG. 4). A suitable fabric cover FC encloses appropriately placed layers of resilient foam material FM as noted in the drawings (FIGS. 7 and 8). Cover FC is preferably formed from leather sections stitched together forming seams 38.

What is claimed is:

1. A bicycle seat comprising:
   a) a first rigid posterior base section defining a relatively wide first support surface for use by a rider;
   b) a nose section extending forwardly and centrally of said posterior base section and defining a relatively narrow width, elongated second support surface for use by the rider, said nose section second support surface being supported on said nose section in a manner which enables a selected portion of said second support surface to relocate its position in response and proportionate to the amount of load placed on said second support surface by said rider; and
   c) wherein the angle between the central axis of said nose section and the vertical plane containing the leading front edge of said first support surface is within a range of 90–125°.

2. A bicycle seat as claimed in claim 1, wherein said first support surface is substantially flat.

3. A bicycle seat as claimed in claim 1, wherein said first support surface is slightly concave.

4. A bicycle seat as claimed in claim 1 wherein said nose section includes means to limit the downward relocation of the said selected portion of said second support surface a.

5. A bicycle seat, comprising:
   a) a first rigid posterior base section defining a relatively wide first support surface for use of the rider of the bicycle;
   b) a nose section extending forwardly and centrally of said posterior base section and defining a relatively narrow width second support surface for use by the rider, wherein the angle between the central axis of said nose section and the vertical plane containing the leading front edge of said first support surface is within a range of 90–125°; and
   c) deformable means operatively associated with a hollow portion of said nose section for supporting said second support surface at locations corresponding to the amount of load placed on said second support surface.

6. A bicycle seat as claimed in claim 5, wherein said deformable means includes a means to limit and centrally locate deformation of said nose section.

7. A bicycle seat as claimed in claim 5, wherein said deformable means comprise a deformable tubular structure having an internal lengthwise extending rib within the structure, and which accepts the load placed on said second support surface, a stop formation in the path of said rib to limit movement of said rib, and load deformable means mounting said rib.

8. A bicycle seat comprising:
   a) a first rigid posterior base section with a relatively wide first support surface; and
   b) a nose section extending forwardly and centrally of said posterior base section and defining a relatively narrow width, elongated second support surface for use by a rider, at least a portion of said nose section second support surface being supported on a deformable portion of said nose section in a manner which enables said support surface to relocate its position in response and proportionate to the amount of load placed thereon by said rider, and wherein the angle between the central axis of said nose section and a vertical plane containing the leading front edge of said first support surface is within a range of 90–125°.

9. A bicycle seat comprising:
   a) a posterior base section having a relatively wide, substantially flat first support surface for use by the rider and that slopes anteriorly;
   b) a nose section extending forwardly and centrally of said posterior base section and having a relatively narrow, elongated second support surface for use by the rider, a portion of said nose section being formed as a deformable structure enclosing therein a hollow space below a selected portion of said second support surface, said space extending lengthwise of a portion of the length of said nose section and being adapted to permit the portion of said second support surface above said space to relocate its position proportionate to the load placed on said second support surface above said space; and
   c) the angle between the central axis of said nose section and the vertical plane containing the leading front edge of said first support surface being formed so as to provide an abrupt transition between the relatively wide posterior base section and the relatively narrow nose section, wherein said angle is Within a range of 90° to 125°.

10. A bicycle seat as claimed in claim 9,
   a) wherein i) the width and slope of said base section first support surface, ii) the size and slope of said nose section second support surface, and iii) the choice of said angle within said range are coordinated such that said first support surface when supporting a rider tends to redistribute the contact pressure through the riders gluteal muscles and hamstrings and away from the perineum, and also tends to avoid the arterial and nerve compression along the rider's pelvic bony structure; and b) wherein the location and size of said space below said second support surface is coordinated to cause the rider's contact pressure to be initially placed along the center of the rider's pelvis and thereafter redistributed through the rider's lateral perineal structures as the rider's load on said nose section increases.

* * * * *